United States Patent [19]

Pendergraft

[11] Patent Number: 4,632,043
[45] Date of Patent: Dec. 30, 1986

[54] METHOD OF TREATING LOW-QUALITY ACID GAS AND FURNACE THEREFOR

[75] Inventor: Paul T. Pendergraft, Tulsa, Okla.

[73] Assignee: Amoco Corporation, Chicago, Ill.

[21] Appl. No.: 690,004

[22] Filed: Jan. 9, 1985

[51] Int. Cl.⁴ .............................................. F23G 7/00
[52] U.S. Cl. ................................... 110/345; 110/203; 110/346; 423/573 G; 423/574 R
[58] Field of Search ............... 110/203, 208, 210, 260, 110/322, 323, 345–346; 423/222, 224, 573 G, 574 G

[56] References Cited

U.S. PATENT DOCUMENTS

| | | | |
|---|---|---|---|
| 3,592,602 | 7/1971 | Palm | 423/574 G |
| 3,851,050 | 11/1974 | Groenendaal et al. | 423/574 G |
| 3,860,697 | 1/1975 | Palm | 423/574 G |
| 3,873,679 | 3/1975 | Berry et al. | 423/574 G |
| 4,035,158 | 7/1977 | Scott et al. | 423/573 G X |
| 4,088,744 | 5/1978 | Reed et al. | 423/573 G |
| 4,123,507 | 10/1978 | Hass | 423/573 G |
| 4,394,119 | 7/1983 | Waller et al. | 423/573 G X |
| 4,400,369 | 8/1983 | Palm | 423/573 G X |
| 4,501,725 | 2/1985 | Lell | 423/573 G X |
| 4,575,453 | 3/1986 | Reed | 422/149 |

Primary Examiner—Albert J. Makay
Assistant Examiner—Steven E. Warner

[57] ABSTRACT

This invention relates to a modified furnace for treating low-quality acid gas streams (those containing less than fifty percent (50%) hydrogen sulfide) to permit stable operation of combustion to provide a Claus furnace effluent. The system comprises burning a fuel gas and indirectly supplying the heat of this combustion to the hydrogen sulfide oxidant reaction wherein the hydrogen sulfide is converted to sulfur and other sulfur-containing products.

12 Claims, 2 Drawing Figures

METHOD OF TREATING LOW-QUALITY ACID GAS AND FURNACE THEREFOR

FIELD OF THE INVENTION

This invention relates to the treatment of acid gas for the recovery of sulfur therefrom. It is particularly applicable to the treatment of low-quality acid gases containing less than fifty percent (<50%) by volume of $H_2S$. In a further aspect, the invention provides a process to eliminate preheating of the acid gas or the combustion air while maintaining a stable flame in the furnace. Further, a particular furnace structure is provided.

BACKGROUND OF THE INVENTION

A basic commercial process for recovery of hydrogen sulfide from acid gas streams is the Claus process. The basic chemical reactions occurring in the Claus process are presented in the following equations.

$$H_2S + \tfrac{1}{2}O_2 \rightleftharpoons H_2O + S \quad (I)$$

$$H_2S + 3/2 O_2 \rightleftharpoons H_2O + SO_2 \quad (II)$$

$$H_2S \rightleftharpoons H_2 + S \quad (III)$$

$$2H_2S + SO_2 \rightleftharpoons 2H_2O + 3S \quad (IV)$$

Reactions (I), (II), and (III) occur in a thermal zone (reaction furnace) sometimes called a muffle furnace, and reaction (IV) occurs primarily in a catalytic zone (catalytic reactor). The Claus process thus comprises two stages: (1) a thermal stage operated above, for example, 1850° F., and typically in the range of 2000° F. to 3000° F. and (2) a catalytic stage generally, for example, operated between a temperature somewhat above the sulfur dewpoint of the gas stream and about 700° F.

In the thermal zone, a gas stream containing hydrogen sulfide can be burned with an oxidant in a reaction furnace to form hot combustion gases containing a substantial amount of free sulfur which can be condensed after cooling the hot combustion gases. Part of the heat of combustion is recovered in a waste heat boiler and sulfur condensed in a sulfur condenser. Thereafter, the lean gas goes to the catalytic reactor system wherein the reaction of Equation (IV) takes place.

Typically, the oxidant is air. However, other oxidants which are suitable include pure oxygen, oxygen enriched air, and sulfur dioxide.

As is well known, the flame temperature in the furnace is a function of the composition of the acid gas. As the hydrogen sulfide content of this gas decreases, the flame temperature also decreases. A flame temperature less than 1850° F. is usually somewhat unstable and a minimum temperature of about 2000° F. is normally recommended. A number of proposals have been made to improve the treatment of low-quality gas streams. One system includes preheating either or both of the products to be combusted, the hydrogen sulfide stream and the oxidant stream. A difficulty in this system does occur since preheating the acid gas above about 600° F. creates a problem as metals above this temperature tend to corrode rapidly when in contact with the gas. The air fed to the furnace can be preheated as high as 900° F. The following table showing flame temperatures is based on an acid gas containing the amount set forth of hydrogen sulfide and carbon dioxide and three percent (3%) water, one and a half percent (1.5%) methane, and one-half percent (0.5%) ethane, all amounts being set forth on a volume basis, in a straightthrough Claus plant and an ambient air temperature of 90° F.

| Acid Gas | | | Air Temperature | Flame |
|---|---|---|---|---|
| % $H_2S$ | % $CO_2$ | Temp. | Into Furnace | Temp. |
| 60.0 | 35.0 | 80° F. | 200° F. | 2016° F. |
| 50.0 | 45.0 | 80° F. | 200° F. | 1880° F. |
| 60.0 | 35.0 | 300° F. | 300° F. | 2156° F. |
| 50.0 | 45.0 | 300° F. | 300° F. | 2021° F. |
| 40.0 | 55.0 | 300° F. | 300° F. | 1888° F. |
| 40.0 | 55.0 | 600° F. | 900° F. | 2241° F. |
| 30.0 | 65.0 | 600° F. | 900° F. | 2053° F. |
| 20.0 | 75.0 | 600° F. | 900° F. | 1803° F. |

Thus, with decreasing $H_2S$ content, it becomes difficult or impossible to maintain a stable flame. Where concentrations are so low that preheating is impractical, it has been suggested that supplemental fuel be either added to the acid gas to increase its heating value or to be burned in an auxiliary burner in the furnace to provide the additional heat which is required. The fuel gas combustion products from either of these methods is mixed with the process gas, thereby diluting the process gas and reducing the recovery. Further, this dilution requires larger process equipment in the downstream treating sections.

An object of this invention is to provide a process for treating low-quality acid gas streams.

A further object of this invention is to provide a furnace for carrying out this process.

Other objects and advantages of the invention will be apparent to one skilled in the art upon reading the accompanying disclosure.

SUMMARY OF THE INVENTION

In one aspect, the invention resides in a method of maintaining reaction temperatures in a Claus reaction furnace where an oxidant is reacted with a hydrogen sulfide-containing gas containing a low hydrogen sulfide content comprising:

providing said furnace with primary and secondary reaction zones in heat exchange relationship;

passing said oxidant and said hydrogen sulfide-containing gas to said primary reaction zone;

passing fuel and oxidant to said secondary reaction zone wherein combustion takes place;

the heat of combustion in said secondary reaction zone raising the temperature of the gases in said primary reaction zones sufficiently to efficiently maintain stable oxidation conditions in said primary reaction zone.

Conditions should be adjusted so that the temperature in the primary reaction zone is at least 1850° F. and preferably at least 2000° F. The primary reaction zone can comprise a ceramic tube and generally a plurality of tubes are used. Any combustible gas can be used such as, for example, hydrocarbons and mixtures of carbon monoxide and hydrogen. Presently preferred as the fuel is a gas containing predominantly methane but other lower hydrocarbons can be present. Typical would be a fuel containing ninety-five percent (95%) methane, four percent (4%) ethane and one percent (1%) propane and higher. The invention should find its greatest use where the hydrogen sulfide containing gas contains ten to fifty percent (10–50%) hydrogen sulfide.

In another aspect, the invention resides in a Claus thermal conversion furnace comprising a primary furnace chamber, an oxidant and a hydrogen sulfide containing gas inlets to said primary furnace chamber, a secondary furnace chamber and heat exchange relationship with said primary reaction chamber, at least one burner in said secondary furnace chamber, means to keep separate the combustion products of said primary and said secondary furnace chambers and means to recover sulfur from the effluent from said primary furnace chamber. The primary furnace chamber can comprise a plurality of ceramic tubes as previously stated. In view of the temperature changes involved in operating and particularly at startup, there will be considerable expansion of these tubes and expansion joints should be provided in the tubes.

The use of this furnace permits the burning of supplemental fuel while avoiding any dilution of the process gas. In the combustion chamber around the tube, fuel is burned with air. This fuel combustion supplies sufficient heat to the process gas so that a stable flame is maintained within the tube or tubes. The excess heat released by the burning of the fuel can be recovered in the waste heat boiler or can be used as process heat elsewhere. The fuel combustion products, after heat recovery, can be released to the atmosphere. The acid gas and air flowing through the ceramic tube would be preheated to the temperature at which combustion can be maintained at which point they are mixed and oxidation takes place.

BRIEF DESCRIPTION OF THE DRAWING

Forming a part of this disclosure is a drawing comprising.

Figure 1:
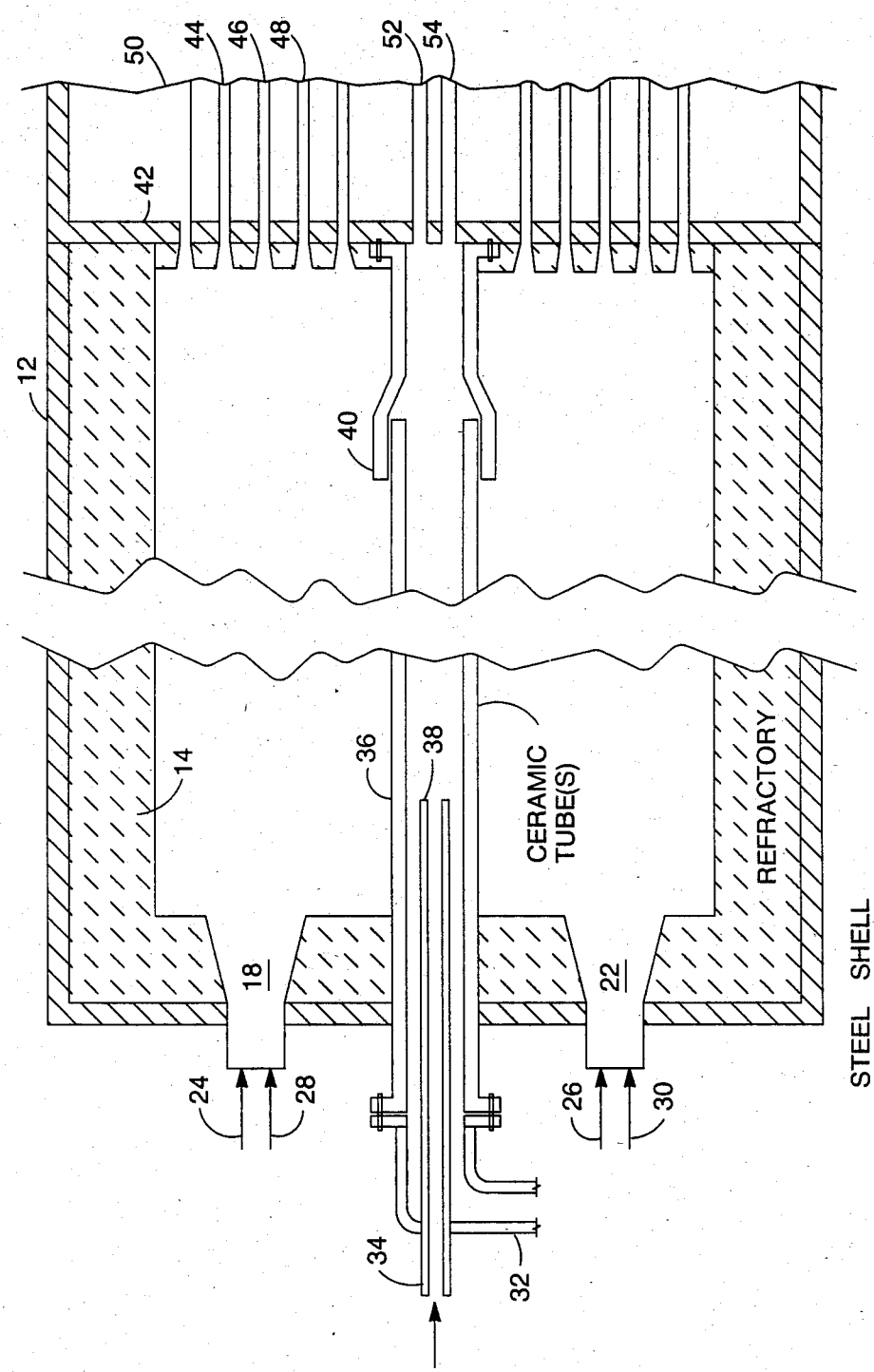
FIG. 1, a cross-section view of the furnace of this invention.

Common reference numerals are used throughout the drawing.

DETAILED DESCRIPTION OF THE INVENTION

Directing attention to the drawing, a specific embodiment of the invention will be seen. It will be understood that various modifications can be made in the specific detail shown and these will be apparent to those skilled in the art. In FIG. 1, a furnace of this invention is shown in cross-section. This furnace comprises a steel shell 12 with a refractory lining 14. At the upstream end of the furnace, burners 18 and 22 are provided, these being the burners in which auxiliary fuel is burned being supplied by air through conduits 24 and 26 and fuel through conduits 28 and 30. The hydrogen sulfide containing gas is supplied by conduit 32 and the oxidant for combustion is supplied through conduit 34. These conduits 32 and 34 extend to ceramic tube 36. The end of conduit 34, designated 38, extends well into ceramic tube 36 so that the reactants are preheated prior to mixing so that oxidation takes place rapidly. Conduit 36 is provided with expansion joint 40 to allow for changes in length as the process is practiced and particularly at startup. In operation, the pressure in the fuel gas combustion chamber is maintained higher than the pressure within tube(s) 36 so that any leakage that occurs is into tube(s) 36 rather than from it to prevent contaminating the fuel gas combustion products with sulfur compounds. The tube sheet 42 containing tubes 44, 46, 48, and the like, convey the combustion gases from the fuel combustion chamber through the waste heat boiler shown generally at 50.

The combustion products from the primary reaction zone pass through tubes 52 and 54 for recovery of waste heat therefrom. The balance of the process is conventional but is shown for completeness.

Figure 2:
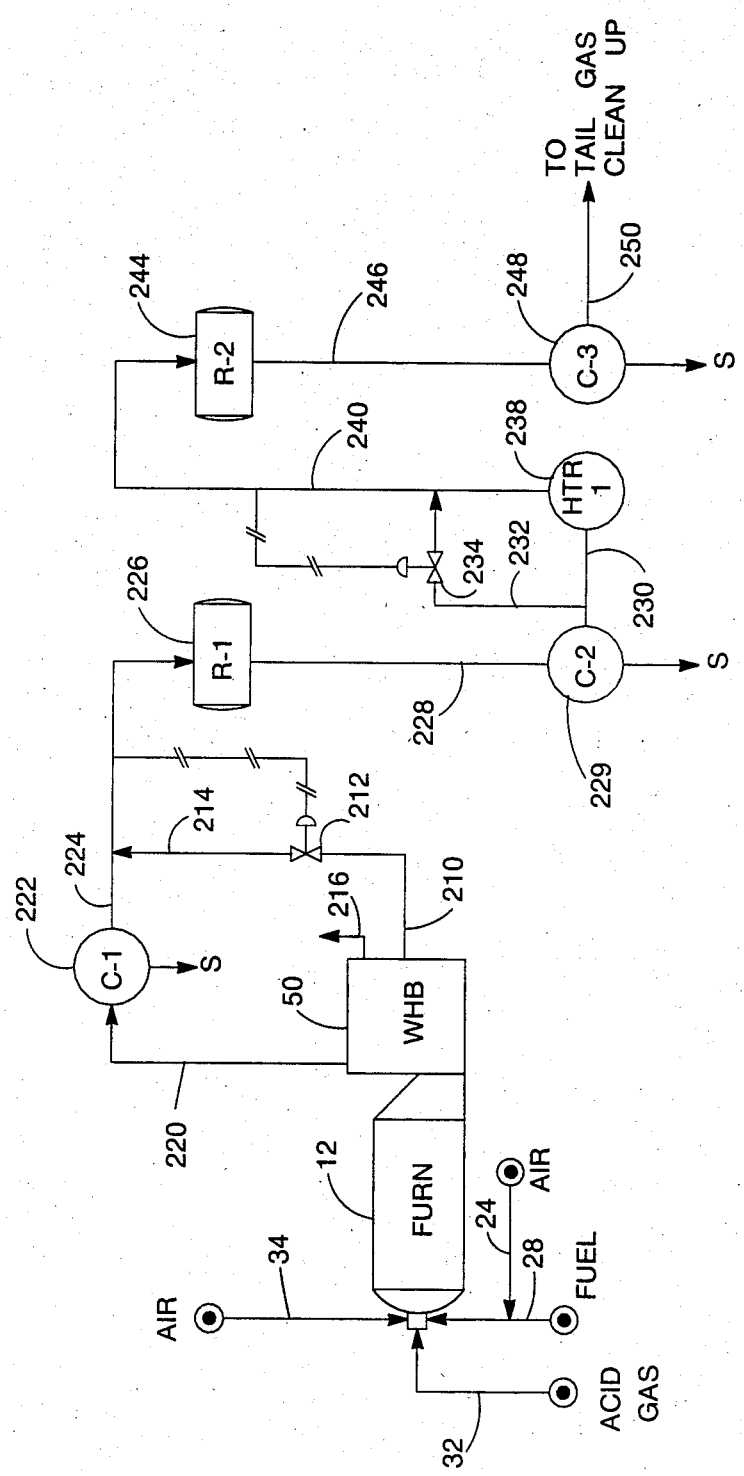
FIG. 2, a schematic representation of the overall Claus process.

FIG. 2 illustrates schematically a two catalytic reactor section Claus plant. Acid gas can be introduced into Claus furnace 12 by line 32; an oxygen containing gas, for example, air can be introduced by line 34. For the system of the present invention, air and fuel are supplied to burners 18 and 22 (see FIG. 1) by conduits 24 and 28, respectively. In the tube(s) 36 of furnace 12, the acid gas, air, and sulfur dioxide are combusted at a temperature above about 1850° F., preferably about 2000° F. to achieve a stable flame, heated by the combustion products of the fuel and air burned in burners 18 and 22, and a hot product effluent stream comprising elemental sulfur, sulfur dioxide, and unreacted hydrogen sulfide is produced. Preferably, sufficient air is used to produce a 2:1 molar ratio of hydrogen sulfide:sulfur dioxide in the hot reaction product effluent stream. The hot product effluents stream can flow to a waste heat boiler 50, shown in flow communication with furnace 12, for cooling. The cooled effluent product stream produced as a result of the combustion of $H_2S$ and the oxidant can be withdrawn from waste heat boiler 50 by line 220, introduced into first condenser 222 and cooled, for example, to below about 400° F. to condense elemental sulfur which is removed. A portion of the cooled effluent products can also be removed from waste heat boiler 208 by line 210, valve 212 and line 214 and used for reheating the first condenser 222 effluent in line 224 prior to entry into Claus catalytic conversion zone. Other methods of reheat can, of course, also be used. The fuel gas combustion products are removed from a separate chamber of the waste heat boiler by line 216.

The Claus catalytic conversion zone illustrated in FIG. 2 uses two Claus catalytic reactors 226 and 244. One or more can be used. Each of the catalytic reactors is provided with catalyst, for example, in a supported bed through which the process stream flows and by which the Claus reaction is facilitated. Any of the known Claus catalysts, such as bauxite and alumina, can be used.

Thus, an inlet stream is provided by line 224 at about 450° F. to first Claus reactor 226. In first Claus reactor 226, hydrogen sulfide and sulfur dioxide react in the presence of the Claus catalyst and produce a first reactor effluent stream, which can be removed by line 228, containing elemental sulfur, hydrogen sulfide, and sulfur dioxide.

The first reactor effluent can be introduced by line 228 into second condenser 229 in which the gas can be cooled, for example, to below about 320° F. and elemental sulfur removed. The condenser effluent stream can be removed by line 230, and heated by first heater 238 or bypassed around heater 238 by line 232, valve 234, to produce in line 240 a heated condenser effluent stream at a suitable temperature for Claus reaction, for example, about 400° F.

The stream in line 240 can be passed through 5 second Claus reactor 244 where the Claus reaction is facilitated and an effluent stream containing elemental sulfur, hydrogen sulfide, and sulfur dioxide can be removed by line 246.

The effluent stream in line 246 can be introduced into third condenser 248, cooled to below the sulfur condensation temperature and elemental sulfur removed to produce a third condenser effluent stream which can be removed by line 250. This stream is passed to a third reactor, not shown, or directly to a tail gas cleanup system.

EXAMPLE

The advantage of the invention can be seen from this example.

Typical recovery in a straight-through Claus plant having three reactors for an acid gas containing twenty percent (20%) hydrogen sulfide, seventy-five percent (75%) carbon dioxide, three percent (3%) water, one and one-half percent (1.5%) methane, and about one-half percent (0.5%) ethane while burning supplemental fuel in a conventional furnace is about eighty-nine and seven-tenths percent (89.7%). A plant with the design disclosed herein has a typical recovery of ninety-four and one-half percent (94.5%). Further, the heat exchangers and reactors can be smaller as the fuel gas combustion products are not diluting the gas stream.

While a specific embodiment has been described herein, it will be recognized that considerable variation can be made in the broad scope of the invention and such modification will be apparent to one skilled in the art upon reading this disclosure.

I claim:

1. A method of maintaining reaction temperature in a Claus reaction furnace where an oxidant is reacted with a hydrogen sulfide containing gas containing a low hydrogen sulfide content comprising:
   providing said furnace with primary and secondary reaction zones in heat exchange relationship;
   passing said oxidant and said hydrogen sulfide containing gas to said primary reaction zone wherein said oxidant is reacted with said hydrogen sulfide containing gas;
   passing fuel selected from the group consisting of hydrocarbons, hydrogen, and carbon monoxide, and mixtures thereof and oxidant to said secondary reaction zone wherein combustion takes place;
   maintaining separate the reaction products of the primary and secondary reaction zones; and
   recovering sulfur from the thus-maintained separate effluent from said primary reaction zone;
   the heat of combustion in said secondary reaction zone raising the temperature of the gases in said primary reaction zone sufficiently to maintain stable oxidation conditions in said primary reaction zone.

2. The method of claim 1 wherein the temperature in said primary reaction zone is at least 1850° F.

3. The method of claim 1 wherein the temperature in said primary reaction zone is at least 2000° F.

4. The method of claim 1 wherein said primary reaction zone comprises a plurality of tubular reaction zones.

5. The method of claim 1 wherein said fuel is a methane containing gas.

6. The method of claim 1 wherein said hydrogen sulfide containing gas contains 10 to 50 mol percent hydrogen sulfide.

7. The method of claim 1 wherein said oxidant is oxygen.

8. The method of claim 1 wherein said oxidant is air.

9. The process of claim 1 in which the pressure in the secondary reaction zone is higher than the pressure in the primary reaction zone.

10. A Claus thermal conversion furnace comprising a primary furnace chamber, oxidant and a hydrogen sulfide containing gas inlets to said primary furnace chamber, a secondary furnace chamber in heat exchange relationship with said primary reaction chamber, at least one burner in said secondary furnace chamber, means to keep separate the combustion products of said primary and secondary furnace chambers, and means to recover sulfur from the effluent from said primary furnace chamber.

11. The furnace of claim 10 wherein said primary furnace chamber comprises a plurality of ceramic tubes.

12. The furnace of claim 11 wherein said ceramic tubes are provided with an expansion joint.

* * * * *